US009240608B2

(12) United States Patent
Lundblad et al.

(10) Patent No.: US 9,240,608 B2
(45) Date of Patent: Jan. 19, 2016

(54) FUEL CELL ASSEMBLY (75) Inventors: Anders Lundblad, Stockholm (SE); Lars Persson, Degeberga (SE); Tommy Lovgren, Ahus (SE); Ola Hultberg, Skanes Fagerhult (SE); Daniel Karlsson, Knivsta (SE)

(73) Assignee: MYFC AB, Stockholm (SE)

( * ) Notice: Subject to any disclaimer, the term of this patent is extended or adjusted under 35 U.S.C. 154(b) by 962 days.

(21) Appl. No.: 13/499,761

(22) PCT Filed: Sep. 30, 2010

(86) PCT No.: PCT/SE2010/051051
§ 371 (c)(1),
(2), (4) Date: Aug. 8, 2012

(87) PCT Pub. No.: WO2011/040875
PCT Pub. Date: Apr. 7, 2011

(65) Prior Publication Data
US 2013/0011766 A1    Jan. 10, 2013

(30) Foreign Application Priority Data

Oct. 2, 2009 (SE) ........................ 0950724

(51) Int. Cl.
*H01M 8/10* (2006.01)
*H01M 8/24* (2006.01)
*H01M 8/02* (2006.01)

(52) U.S. Cl.
CPC ............ *H01M 8/241* (2013.01); *H01M 8/0202* (2013.01); *H01M 8/0297* (2013.01); *H01M 8/2465* (2013.01); *H01M 8/0247* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 5,863,672 A | 1/1999 | Ledjeff et al. |
|---|---|---|
| 5,952,118 A | 9/1999 | Ledjeff et al. |
| 6,127,058 A | 10/2000 | Pratt et al. |
| 2005/0202297 A1 | 9/2005 | Schmitz et al. |
| 2006/0019129 A1 | 1/2006 | Liu et al. |
| 2010/0009237 A1 | 1/2010 | Wolff et al. |
| 2011/0151345 A1 | 6/2011 | Lundblad et al. |

FOREIGN PATENT DOCUMENTS

| DE | 102006048860 | 4/2008 |
|---|---|---|
| JP | 2005340158 A | 12/2005 |

(Continued)

OTHER PUBLICATIONS

Extended European Search Report, dated May 30, 2014, from corresponding EP application.

(Continued)

*Primary Examiner* — Tracy Dove
(74) *Attorney, Agent, or Firm* — Young & Thompson (57) ABSTRACT A polyelectrolyte membrane fuel cell apparatus, includes a backing plate, a top clamping plate, at least one in-plane planar fuel cell assembly interposed between the top plate and the backing plate, and a current collector foil interposed between the planar fuel cell(s) and the top clamping plate, the current collector foil including an electrically non-conductive foil having a pattern of electrically conductive material provided thereon on the side facing the planar fuel cell. The fuel cell apparatus is held together by spot welds between the top clamping plate and the backing plate.

20 Claims, 13 Drawing Sheets

(56) References Cited

FOREIGN PATENT DOCUMENTS

| | | |
|---|---|---|
| JP | 2006086045 A | 3/2006 |
| WO | 2006041397 | 4/2006 |
| WO | 2009025613 | 2/2009 |
| WO | 2009025614 | 2/2009 |

OTHER PUBLICATIONS

International Search Report dated Jan. 3, 2011, in corresponding PCT application.

Figure 10:
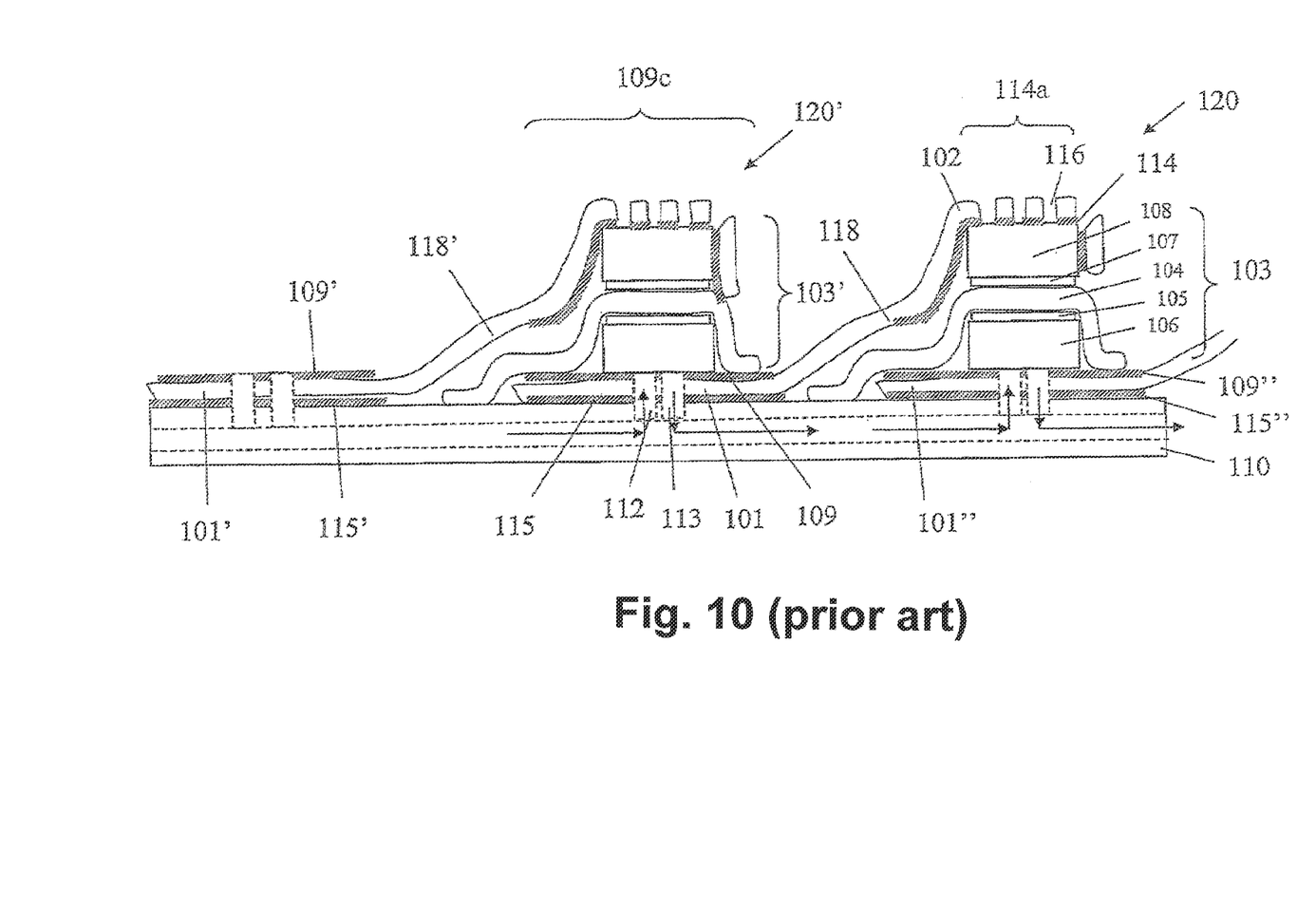
FIG. 10 is an example of a prior art device.

Fig. 12 ent. The fuel cell 120 is thus adapted to be connected in series to one or more similar fuel cells 120' and to be attached to an anode support 110 having openings 112, 113 for gas access. Accordingly, the fuel cell 120 comprises a current collector element 118 and a membrane electrode assembly MEA 103. The current collector element 118 comprises an electrically conductive foil consisting of a cathode current collector portion 102 and an anode current collector portion 101. The MEA 103 comprises a solid ion conducting polymer membrane electrolyte 104, an anode 105, an anode gas backing 106 or gas diffusion layer (GDL), a cathode 107 and a cathode GDL 108, and is arranged in the fuel cell 120 such that the cathode GDL 108 is directed towards the cathode portion 102 of the current collector element 118, and the anode GDL 106 is directed away from the current collector element 118. The MEA is attached to the current collector element 118 by means of an adhesive layer 114 provided on the cathode portion 102 of the current collector element 118, said adhesive layer 114 covering a region 114a adjacent and corresponding to the cathode GDL 108, and being electrically conductive in at least the region 114a. The different elements and adhesive layers of the fuel cell according to this embodiment may be the same as described for the single cell fuel cell above. The anode portion 101 of the current collector element 118 extends laterally from the cathode current collector portion 102 and functions as an anode current collector for an adjacent series-connected fuel cell 120' when in use. The anode current collector portion 101 has openings 112, 113 for gas access, and is provided with an adhesive layer 109 on a surface of the current collector element 118 directed away from the cathode side of the membrane electrode assembly 103 of the fuel cell 120.

Figure 11:
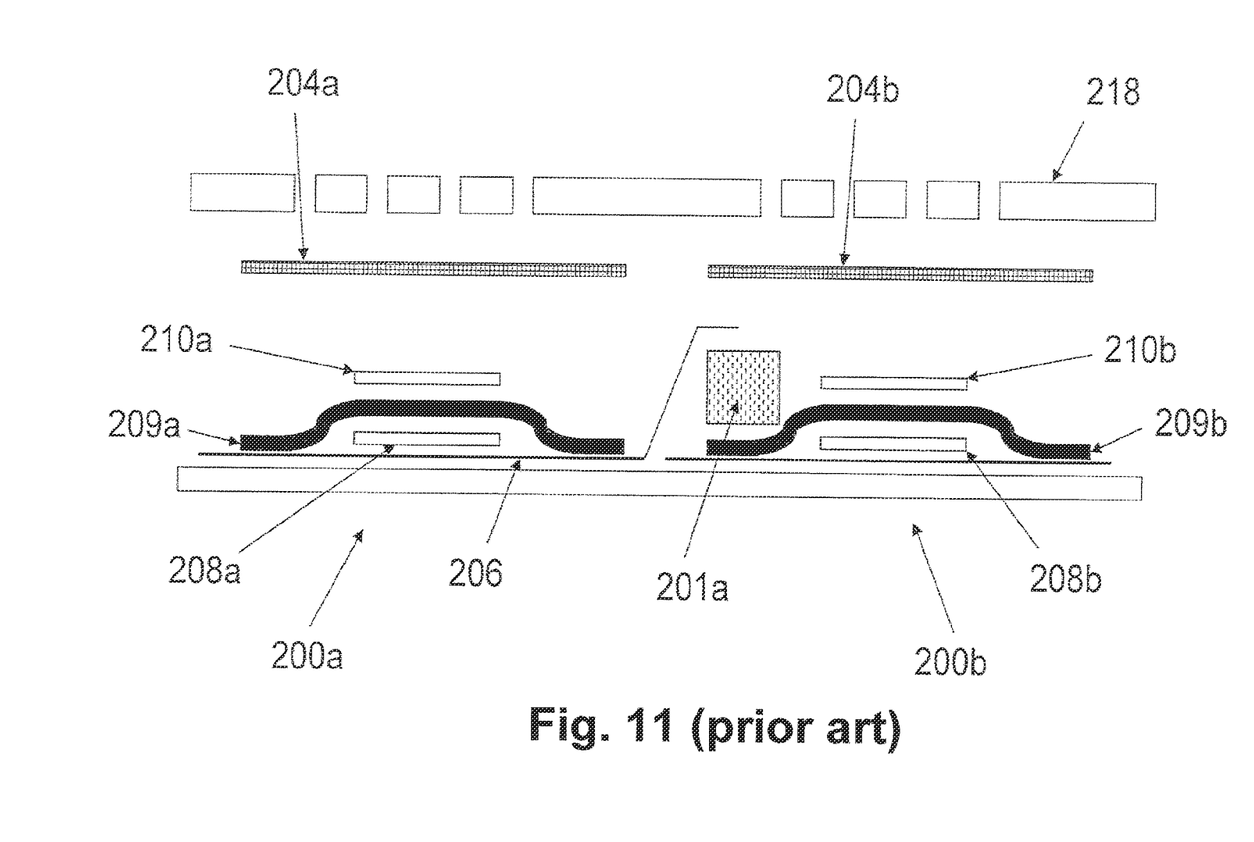
FIG. 11 is another example of a prior art device.

Also in WO 2009/025613 there is disclosed a planar configuration air breathing polymer electrolyte fuel cell assembly, shown in FIG. 11 in the present application. Two cells 200a and 200b, respectively, connected in series are shown. Each comprises an anode GDL 208a and 208b, a cathode GDL 210a and 210b, a MEA 209a and 209b, and an inert conductive clamping element 204a and 204b, respectively. A conductive foil 206 is provided beneath the anode part of the first cell 200a (to the left) and extends out to the right for connection to the second, adjacent cell 200b. An insulating spacer member 201 is interposed between the anode conductive foil 206 (extending from under the anode side of one cell 200a, to the left in the figure) and the MEA 209b of the adjacent cell, so that the electrical connection to the clamping means component 204b (e.g. a gold plated net or a steel plate) of an adjacent cell 200b is ensured, while at the same time ensuring that the foil 206 is electrochemically insulated from the MEA 209b of the adjacent cell 200b, when the assembly is pressed to the top clamping plate (e.g. by clamping/screwing together the top clamping plate and a backing plate, not shown in the figure). Thus, the first current collector 206 has an extended portion which is in contact with the upper surface of said spacer member 201 when clamped by said inert conductive member 204b against the spacer member 201.

In U.S. Pat. No. 6,127,058 (Motorola) there is disclosed a planar fuel cell. In one embodiment the current collector assembly is fabricated in a very thin and flexible format by replacing the plastic frame with a plastic film that has metal current collectors, for example, using a structure very much like a flexible circuit board. The laminated structure comprising the MEA disposed between the two current collector assemblies is in general terms said to be held together by ultrasonically welding or by use of adhesives at the interfaces. There is no specific disclosure of the methods of assembling.

SUMMARY OF THE INVENTION

There is always a strive to simplify manufacturing and to reduce cost of manufacture in all kinds of industry. As an example the number of components in any product will most certainly affect the manufacturing cost, and thus minimizing the number of components is desirable.

The present invention provides a polymer electrolyte membrane fuel cell with fewer components and which is easier to manufacture.

In particular the present invention provides a novel way of assembling the fuel cells, namely by spot welding.

The fuel cell assembly according to the invention is defined in claim 1.

In particular there are provided welding support members forming spacers defining the thickness/spacing between top and backing plates in the assembly. In a preferred embodiment the backing plate is provided with spot welding support tongues also functioning as spacers to define the thickness of the fuel cell assembly. In this way the manufacturing is further simplified.

Furthermore, the invention provides a new configuration of the current collector, using a flexible foil as a base substrate on which the necessary conductive patterns are provided. The novel feature is that the current collector foil is interposed between the top plate of the assembly and the planar fuel cell(s), and preferably covers all unit cells in the assembly.

Also the current collector flexfoil comprises additional functions, such as sensors and control means for controlling operation of the fuel cell assembly.

Further scope of applicability of the present invention will become apparent from the detailed description given hereinafter and the accompanying drawings which are given by way of illustration only, and thus not to be considered limiting on the present invention, and wherein.

DETAILED DESCRIPTION OF PREFERRED EMBODIMENTS

For the purpose of the present application the following terms will have the meanings given.

An "in-plane fuel cell assembly" means a plurality of individual fuel cell units arranged side-by-side in series and/or parallel connection. Supply of both electrical current and fuel gas can be arranged in series and/or in parallel.

A "sticker assembly" is a unit consisting of a plurality of individual fuel cell units ("stickers") arranged as an "in-plane fuel cell assembly" on a base foil. In particular a "sticker assembly" comprises all active fuel cell components (i.e. anode and cathode Gas Diffusion Layers (GDL), Membrane Electrode Assembly (MEA), frames defining compartments), and adhesive to fix components to each other as well as a base foil on which active components are attached.

A "flexfoil" is an item similar to a printed circuit board (PCB), except that it is very thin and flexible. A flexfoil is used as a current collector in the present invention.

A "flexfoil" is a Cu-coated plastic foil, from which the Cu has been selectively removed in order to form current leads between different areas in the foil. In order to improve the electrical contact between e.g. the cathode GDL and the Cu-layer, the Cu layer can be coated with for example gold, by e.g. electroplating. Said coating can be done on selected areas by coating (e.g. painting) the Cu-layer with paint on areas which should not be gold coated, and this is done before the gold coating. Typical thickness of the Cu-layer is 20 to 50 micrometers. The plastic support film can be made of e.g. PET (poly ethylene tereftalate), which is cheap or Polyimid, which is more expensive but can withstand soldering operations if needed.

The core of the present invention is the design of a planar multi-cell fuel cell assembly where the top (cathode side) and the bottom plates are clamped together and joined by welding. This design requires that the top and the bottom plates are electrically insulated from the active fuel cell components being placed between these plates.

One preferred way of insulating the top plate from the fuel cell sticker is to use a flexfoil, as defined above, having gold coated Cu foil which also can serve as a current collector for the active fuel cell components. Additional current leads on the flexfoil can be used as probes for monitoring e.g. the cell voltages of the individual cells. The flexfoil can have an extention to an electrical contact, thus, making it very simple to electrically attach the fuel cell assembly to the electronic power and control circuit of the fuel cell device.

Figure 1:
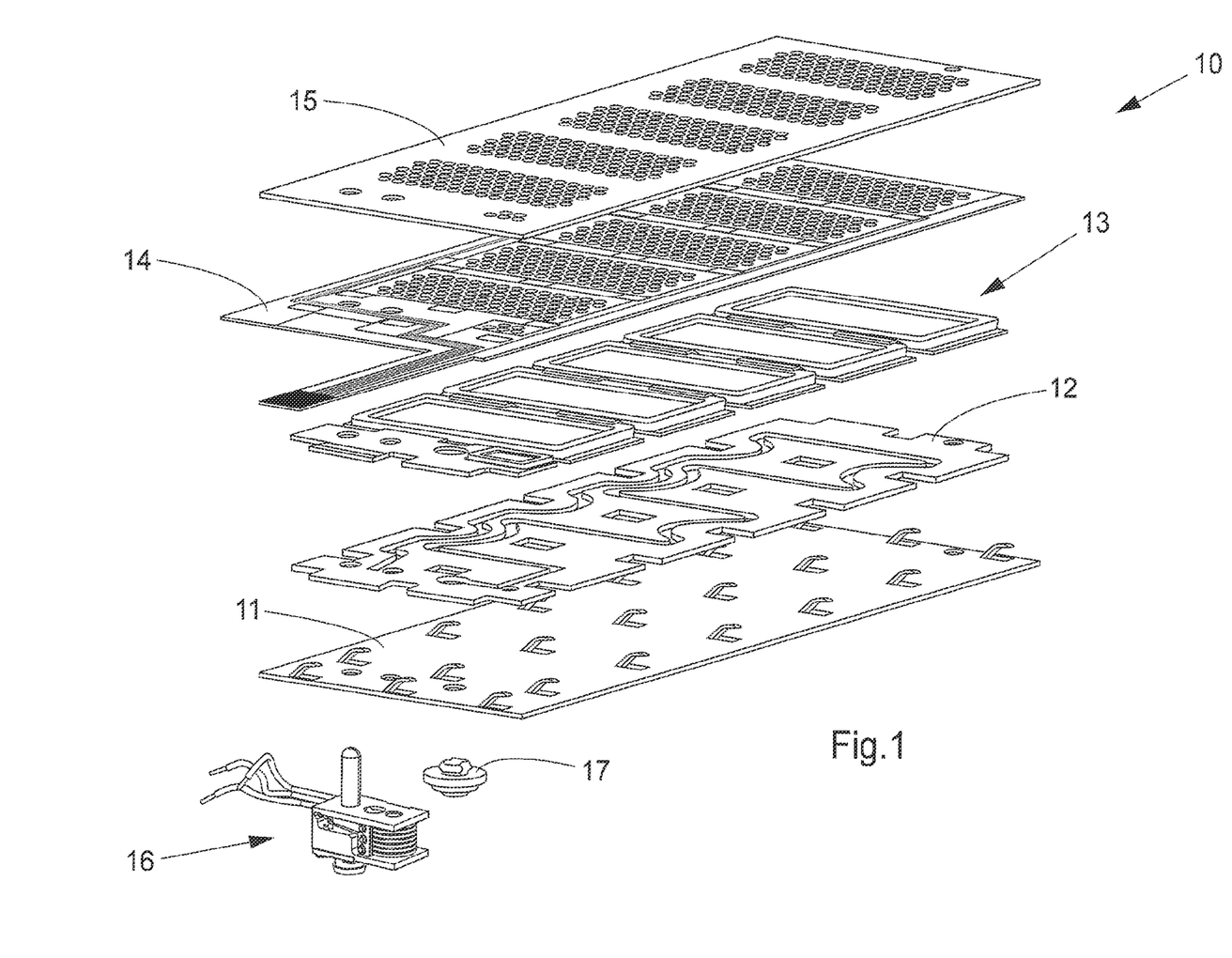
FIG. 1 shows a fuel cell assembly according to the invention in exploded view.

A fuel cell assembly according to the present invention comprising the novel and inventive spot weld joints and new current collector configuration is disclosed in FIG. 1 in an exploded view and generally designated 10.

From bottom up the assembly comprises a backing plate 11, a gas distribution member 12, a sticker assembly 13, a flexible current collector member 14 and a top cover/clamping plate 15.

For controlling the gas flow within the fuel cell there is provided an electro-mechanical valve 16 and an "umbrella valve" 17.

Figure 2:
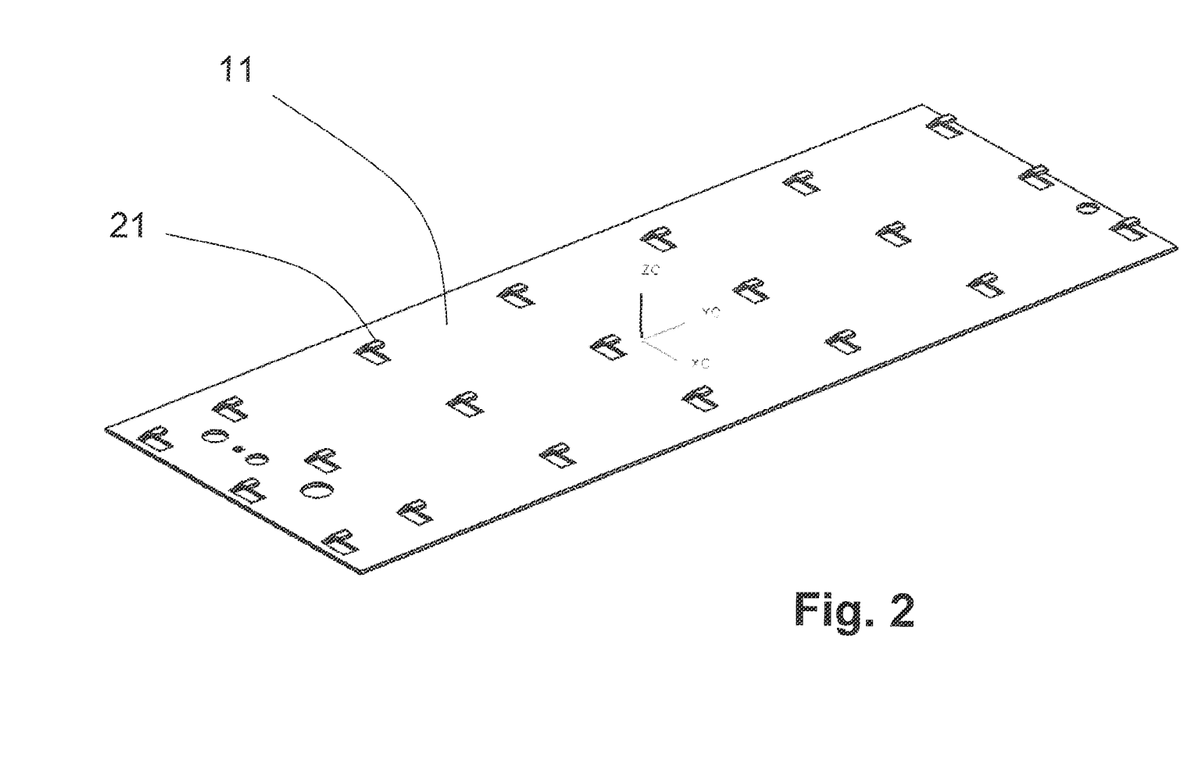
FIG. 2. shows a backing plate with welding support members according to the invention.

FIG. 2 shows the backing plate 11. It is suitably made of metal since it is to be used for spot welding the fuel cell unit together. To provide suitable contact points for the spot welding and also to provide a spacer function, the backing plate is provided with protruding welding support members 21, in the shown embodiment in the form of bent tongues 21. The tongues are formed by removing material on three sides of an area of the material in the backing plate, entirely through the plate thickness, Thereby forming a tongue. The tongue thus formed is bent upwards, and again the tongue is bent such that a portion thereof extend essentially parallel with the surface of the backing plate. These tongues can suitably be provided by a punching operation.

In an alternative embodiment, the tongues can be formed on the top clamping plate.

An advantage with this configuration is that the support is resilient which is useful when the assembly is put together. The resilient properties of the tongue is also helping to maintain the clamping force when, over time, some of the components in the fuel cell sticker are compressed and deformed (e.g. the GDL).

However, if resilience is of minor importance, the tongues could be made by simply deforming the backing plate at corresponding points to provide small "hills" on the surface, the height of each "hill" defining the spacing between top and backing plates.

Suitably the height of the protruding weld supports is slightly smaller than the desired spacing between backing and clamping plates, and is about 0.3-3 mm, suitably 0.7-1.5 mm. This is because of the fact that the components in the assembly as a whole will be slightly resilient and when compressive force is applied during spot welding, the support members will contact the top clamping plate in a state where the stacked components will exert a counter force, urging the plates apart.

Figure 3:
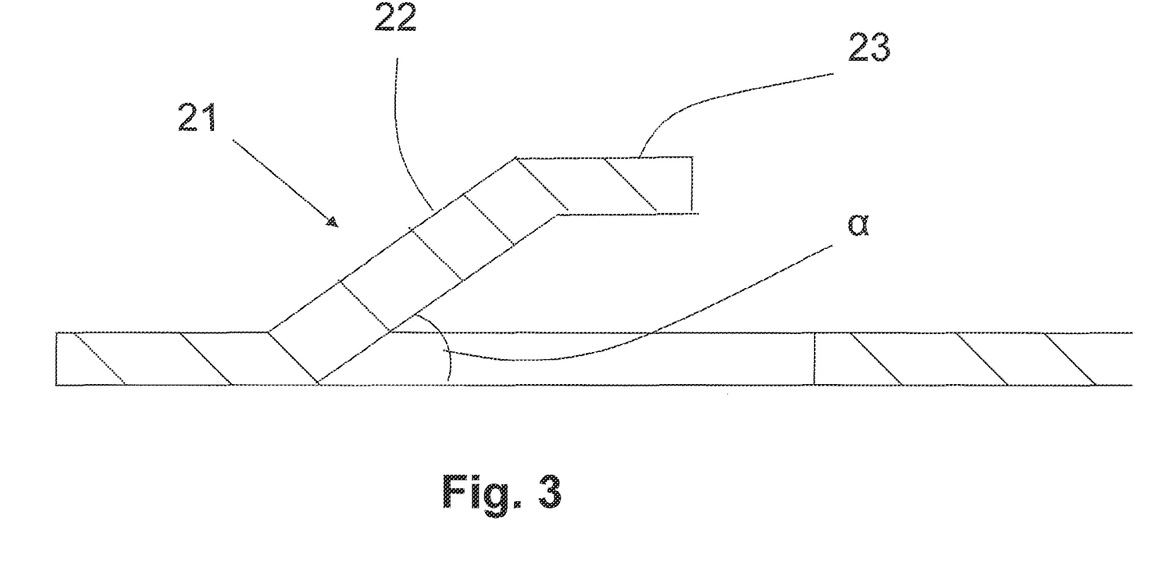
FIG. 3 shows a welding support member in cross-section.

FIG. 3 shows a cross-section through one embodiment of a spot welding support member 21. Each member 21 comprises a stem portion 22 and a lug portion 23 and functions as a resilient tongue. The stem 22 provides the resilience during and after assemblage of the device, and the lug 23 is the actual welding contact point.

The angle α of the deviation of the stem 22 from the horizontal plane of the backing plate 11 will influence the resilience and the strength of the tongue. A small angle gives a better resilience and a large angle increases the strength and stiffness of the joint. A large angle also requires a larger lateral movement between the support and top plate, when it should spring back and compress the fuel cell components between the clamping plates. The desired angle is 10-60 degrees, suitably 20-45 degrees. The thickness of the top plate and of the support plate is between 0.2 and 1.2 mm, suitably between 0.4 and 0.7 mm.

The suitable distance between the weld spots are dependent on the thickness and mechanical strength of the top plate and the support plate. For a top plate and support plate thickness of 0.5 mm distance between the weld spots should suitably not be more than 20 mm.

Figure 4:
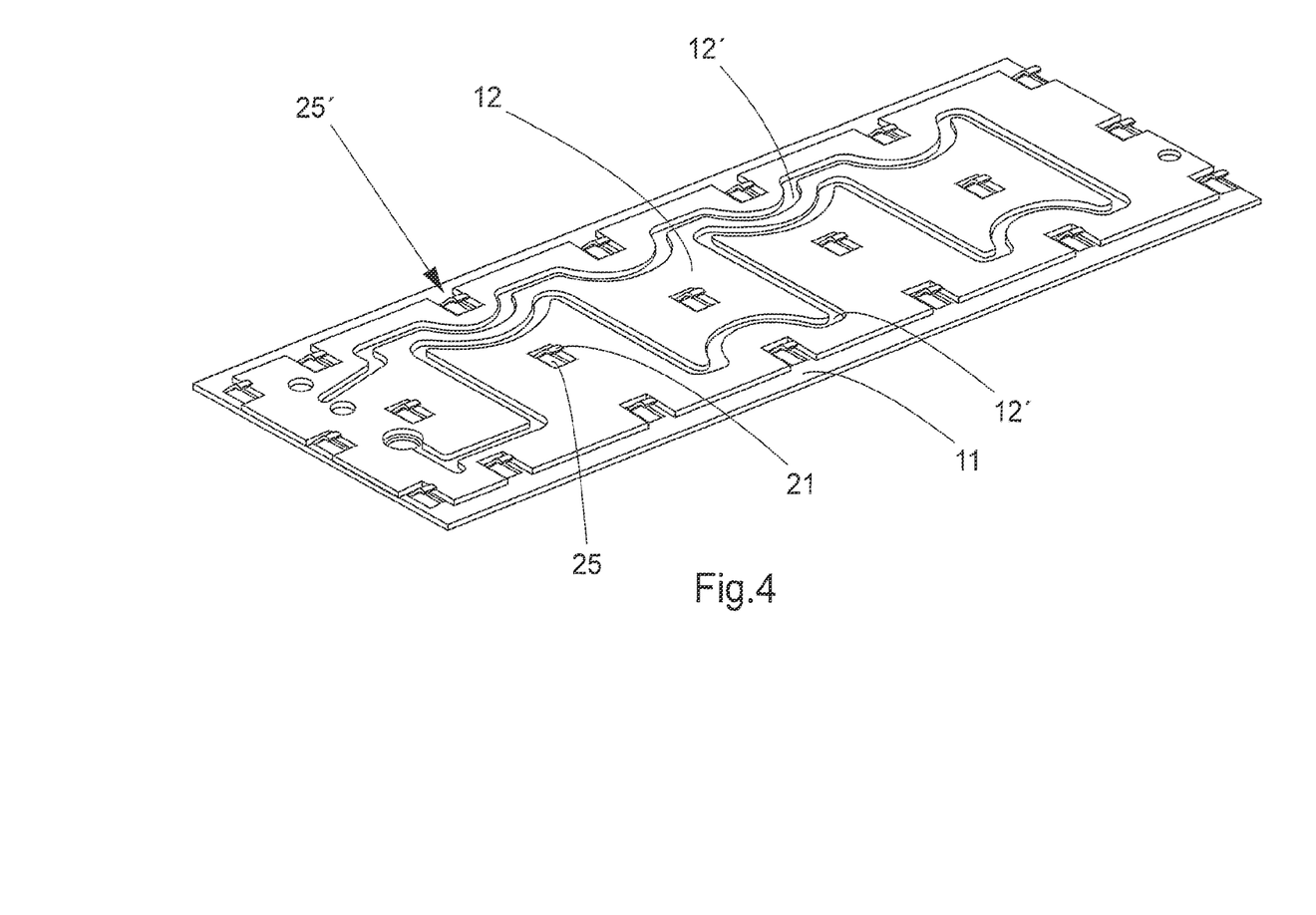
FIG. 4 shows a backing plate with a gas distribution member provided thereon.

FIG. 4 shows the gas distribution member 12 arranged on the backing plate 11. The gas distribution member 12 comprises grooves 12' extending through the material so as to form gas channels when the gas distribution member is clamped between the other components of the assembly. The gas distribution member also comprises holes 25 or cut-out portions 25' to accommodate the spot welding support members 21, such that the latter can extend through the gas distribution member 12.

Figure 5A:
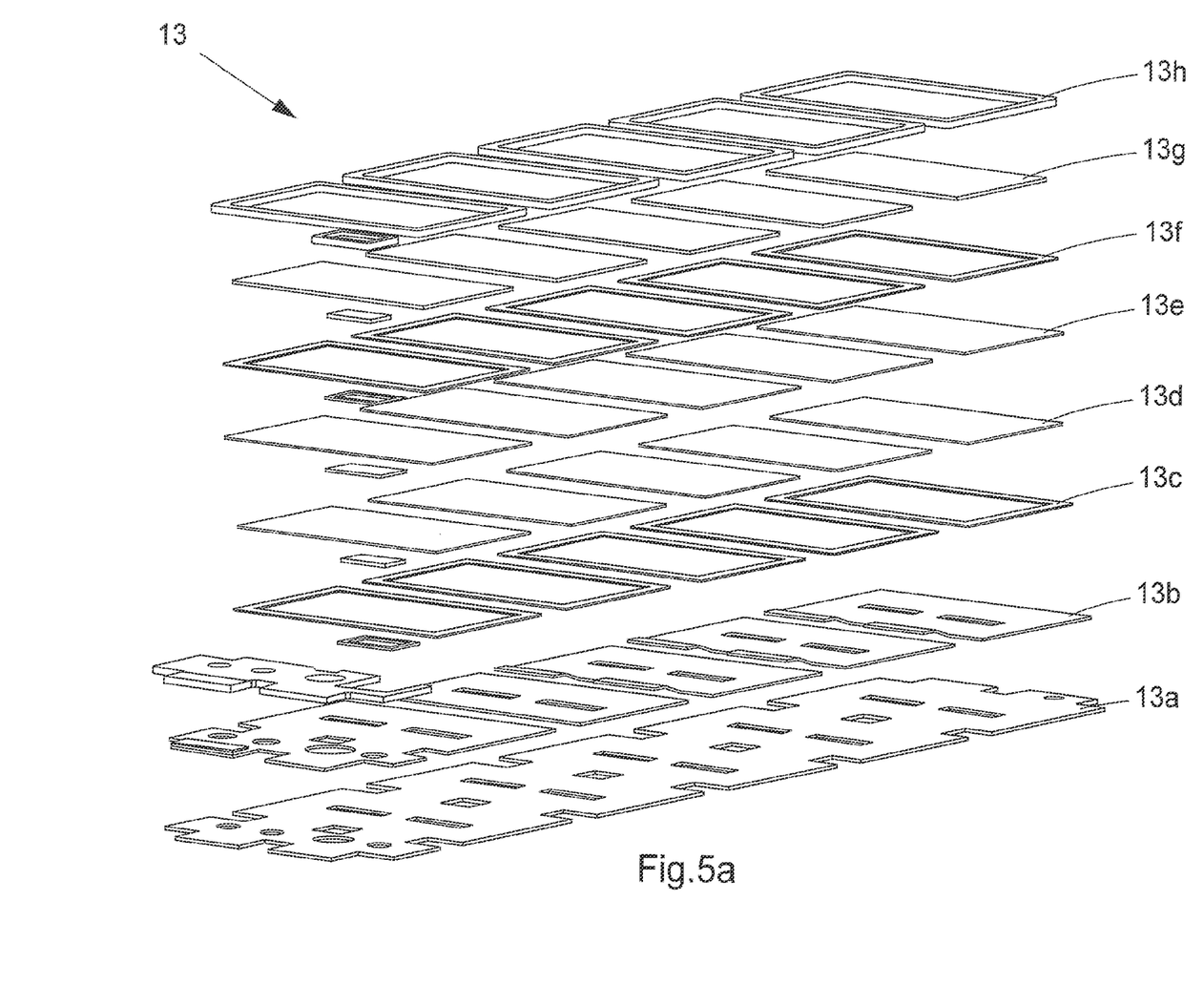
FIG. 5a shows a "sticker" assembly in exploded view.

FIG. 5a shows one embodiment of a sticker assembly 13 in an exploded view. Details of a sticker of this kind will not be given herein since its design is disclosed fully in PCT SE2008/050932, which is a patent application for one of applicants own inventions. However, for completeness of disclosure the following brief description is given.

In the shown embodiment the sticker assembly 13 comprises a base foil 13a, on which a number of Sn coated Cu foils 13b are located, one for each unit fuel cell. These foils are anode current collectors, and each has a portion that extends up between adjacent unit cells (i.e. assembly of elements 13c-h). These portions thus form "tongues" that rest on the upper surface of the frames 13h, where they are contacted by the current collector flexfoil, described below. A Membrane Electrode Assembly (MEA) 13e is placed over each GDL 13d and there is provided adhesive 13c for gluing Membrane Electrode Assemly (MEA) 13e on the Cu foil. Cathode GDLs 13g are placed on each MEA and additional adhesives 13f are interposed between MEA and a porous compressible frame material 13h.

Figure 5B:
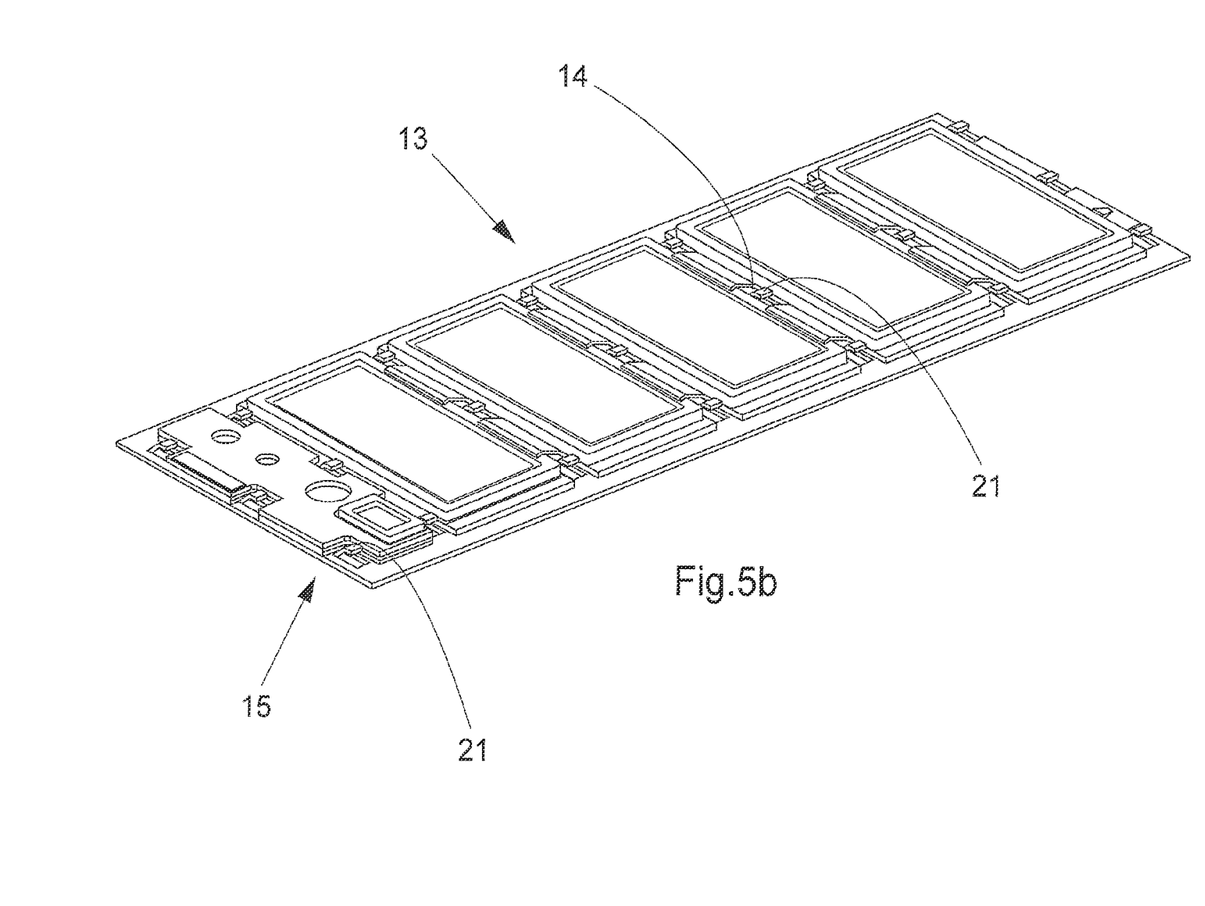
FIG. 5b shows a sticker assembly according to FIG. 5 arranged on the backing plate and gas distribution member as shown in FIG. 4.

FIG. 5b shows the assembled sticker assembly 13 positioned on the gas distribution member (not seen in the figure).

As can be seen, also the sticker assembly 13 is adapted by having a suitably designed contour with holes 14 and cut-out portions 15 so as to allow the spot welding support members 21 to extend through the upper surface of the sticker assembly 13.

Figure 6:
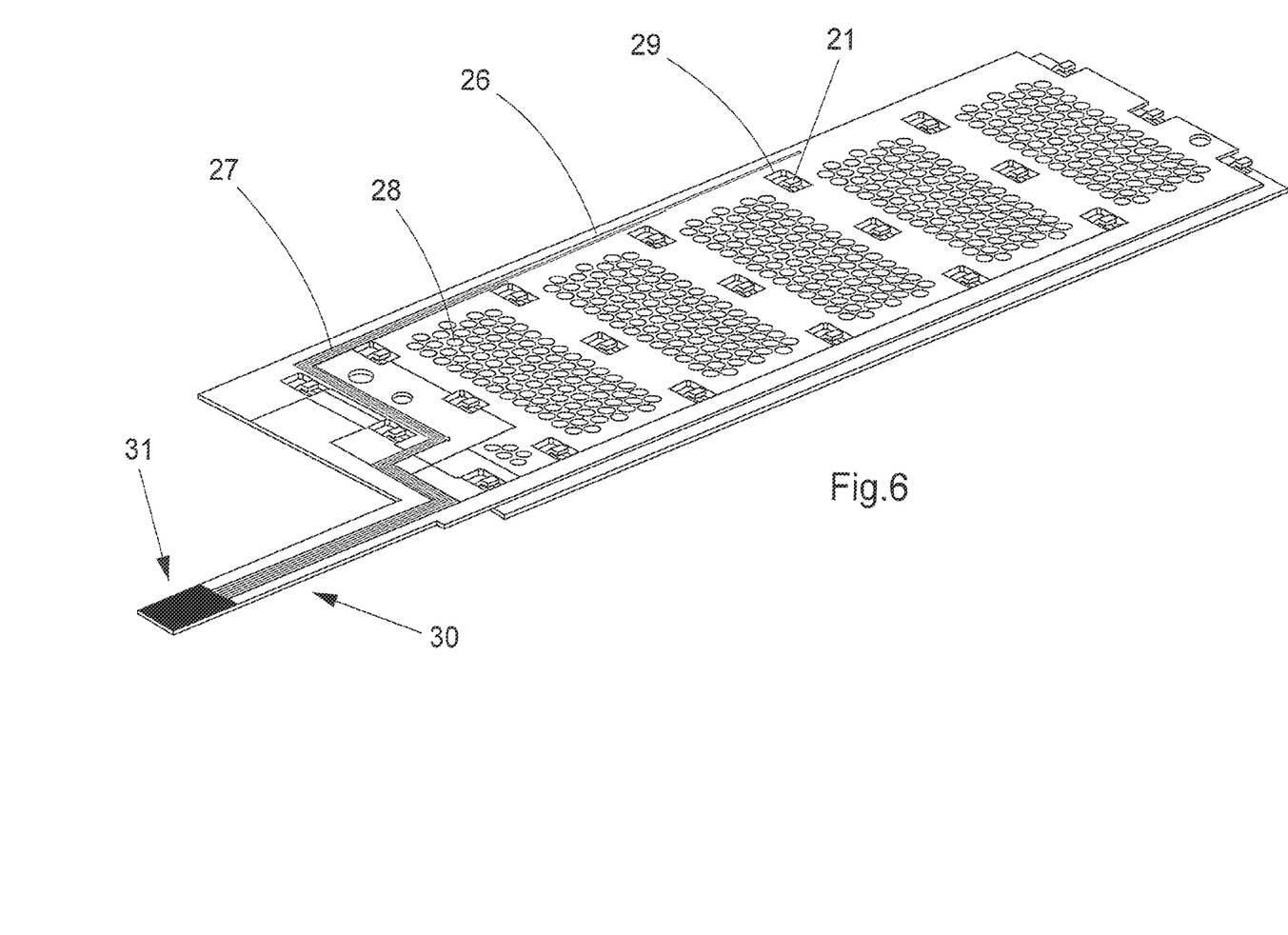
FIG. 6 shows the assembly of FIG. 5b with a flexfoil arranged on top.

FIG. 6 shows the provision of the novel and inventive current collector foil 26 placed on top of the sticker assembly 13. The current collector foil 26 comprises a thin sheet of a non-conductive, preferably polymer based material. The foil 26 is provided with venting holes 28 to provide the fuel cell cathodes with air. On the side facing the sticker assembly the current collector is provided with a pattern 27 of conductive material, preferably copper (Cu). The pattern provides electrical leads to and from the individual cells in the sticker, and also sensing points for detecting i.a. temperature and cell voltage. The current collector foil is described in more detail in connection with FIG. 8.

Figure 7:
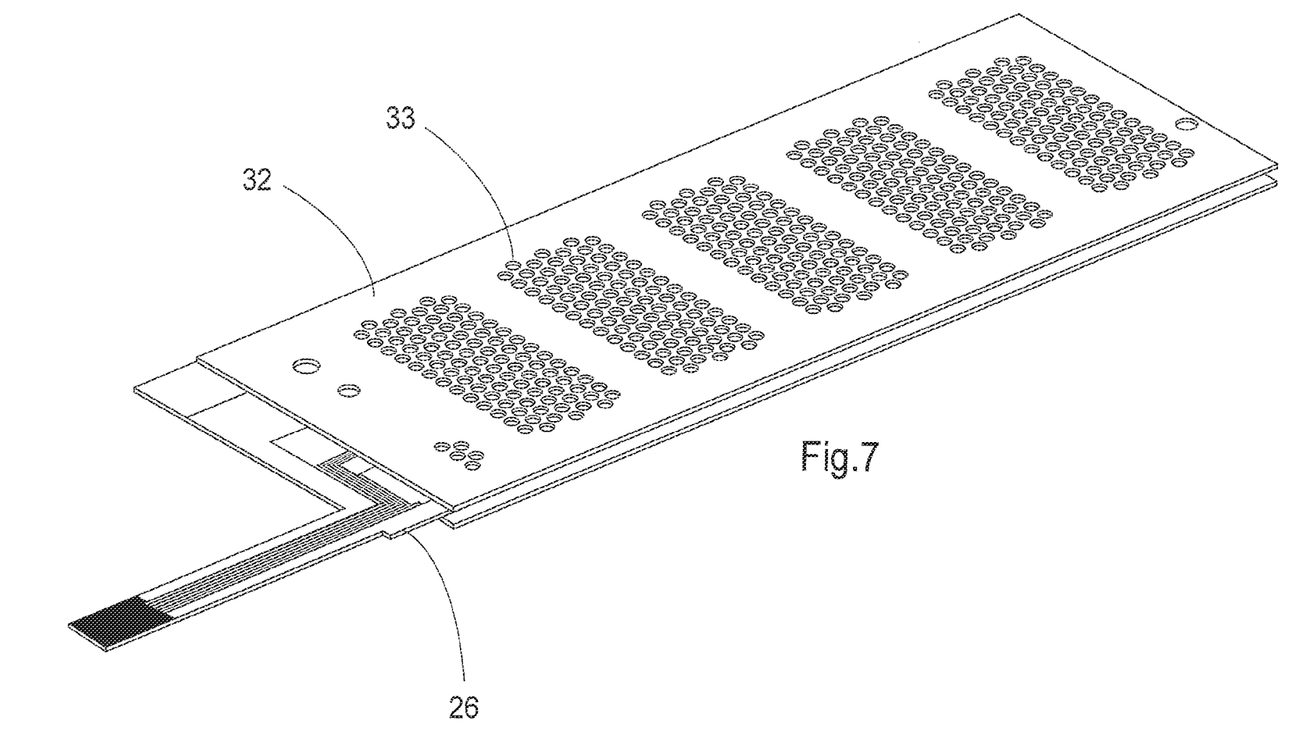
FIG. 7 shows the assembly of FIG. 6 with a top clamping plate provided thereon.

FIG. 7 shows the top clamping plate 32 arranged over the current collector foil 26. The clamping plate is provided with venting holes 33 corresponding to the holes 28 in the current collector foil.

As already discussed above the entire assembly is finally joined by spot welding, suitably in one single operation in a welding machine having a pattern of electrodes matching the spot welding support members 21 on the backing plate 11. Other than spot welding with electric current, laser spot welding is possible.

Figure 8:
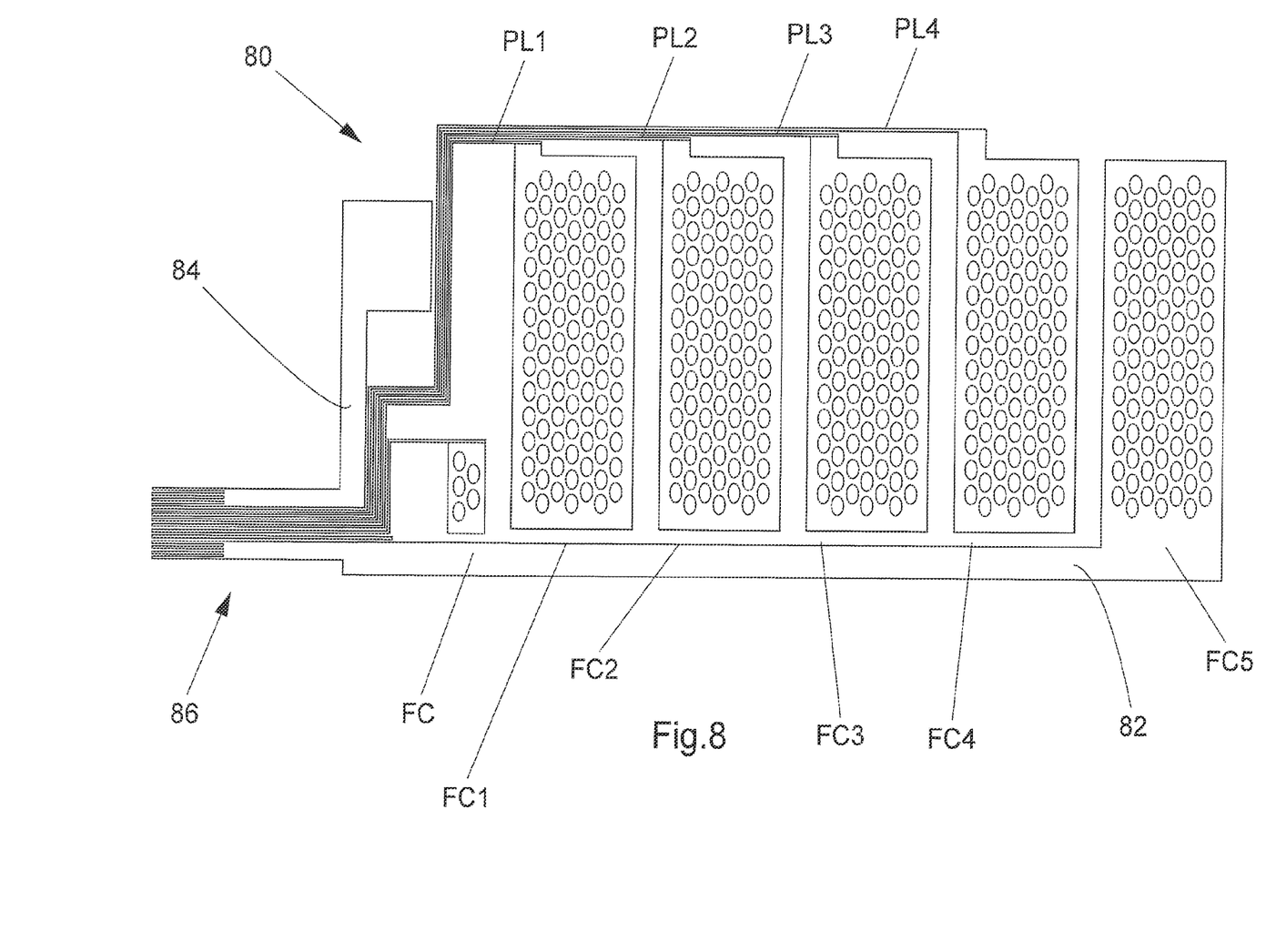
FIG. 8 shows schematically a current collector flexfoil according to the invention in a top view.

A current collector foil according to the invention is shown in FIG. 8 adapted for a device comprising five fuel cells and one sensor cell in an in-line configuration. The current collector is made of flexible foil material and is referred to as a "flexfoil" as defined above, provided with a conductive pattern. Preferably the conductive pattern comprises Cu, optionally coated with Au. The current collector foil extends over the entire assembly.

The flexfoil 80 has two current leads, a cathode current lead 82 connecting to the cathode of the fifth cell (to the far right in FIG. 8) and an anode current lead 84 connecting to the anode side of the first cell (to the far left in FIG. 8) for conveying the power generated in the fuel cells to an output terminal.

The contact portions for the fuel cells are referred to as FC1-FC5, respectively, and for the sensor cell as SC. From each cell in the in-plane assembly there is provided a probe lead PL1, PL2, PL3, PL4 which enables the probing of each cell voltage. The probe leads can also be used for short circuiting of each cell, for example during shut down of the fuel cell.

Thus, the conductive pattern forms electrical conductors comprising leads for transporting electric current generated by the fuel cell(s) and connectors for coupling the fuel cell to external devices. The conductive pattern can also comprise leads for supplying voltage for operating and/or controlling a valve.

The conductive pattern suitably also comprises elements usable as sensing means for sensing temperature and/or voltage. Such sensing means can include a thermoelement and/or a thermoresistor.

Preferably, the current collector foil comprises a tongue portion 86 extending in the longitudinal or transversal direction out from the assembly to provide a connector for external coupling.

Thus, a current collector foil for an in-plane polymer electrolyte membrane fuel cell assembly according to the invention, in one embodiment comprises a backing plate; a top clamping plate; at least one planar fuel cell assembly comprising a plurality of fuel cell units interposed between said top plate and said backing plate. The current collector foil in particular comprises a base/substrate foil of a non-conductive and flexible material; a pattern of a conductive material provided on said substrate foil, the pattern comprising electrical leads and optionally functional components, such as sensors; wherein said conductive pattern is adapted to match the layout of said in-plane polymer electrolyte membrane fuel cell, such that when the current collector foil is attached to said assembly, the fuel cell units making up the assembly are connected in series by said current collector foil.

On the areas of the foil covering the active cells of the sticker there are provided venting holes 28 for air access to the fuel cells.

The foil 26 like the other components in the entire assembly has a plurality of holes 29 and cut-out portions to accommodate the spot welding support members 21, and to enable them to come into contact with the top clamping plate for the welding operation.

Furthermore, the foil at least at one of its ends has a flap 30 protruding suitably in the longitudinal direction on which the electrical leads of the conductive pattern 27 terminate so as to form a contact area 31 for external connection of the assembly. By the provision of this terminal contact area soldering of external components can be avoided, which further simplifies manufacturing and assembly.

In alternative embodiments, the fuel cell assembly can also be made in a rounded or arched shape.

Figure 9A:
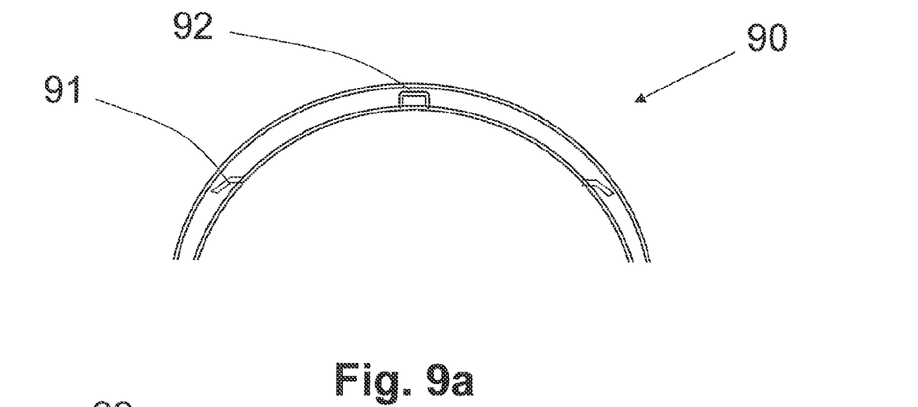
FIG. 9a illustrates an arched embodiment of the assembly according to the invention schematically.

FIG. 9a shows a schematic cross-section of such a rounded assembly, generally designated 90. Here there are provided two different kinds of support members. On one hand members similar to those previously described in connection with FIG. 3. In this embodiment the tongues provided off-centre are all pointing outwards, i.e. towards the edge of the plate. On the other hand, there are provided centrally located support members 92. These centrally located support members have a configuration as shown in FIG. 9b.

If the top plate and the support plate are not fully preshaped there will be a resilience (movement upwards of the sides) in the top plate and the support plate which will lift the outer ends of the bent assembly after welding ("fully preshaped" refers to a situation where the plates have been bent to the final shape before welding; thus "not fully preshaped" means that the outer ends of the bent plate are forced down during welding). In the opposite situation, i.e. if the outer ends are forced up during welding, the tongues on the support plate should preferably point inwards. The design of the outwards pointing tongues on the support plate will provide increased clamping force due to this resilience (alternatively inwards pointing tongues if the tongue is on the top plate).

Figure 9B:
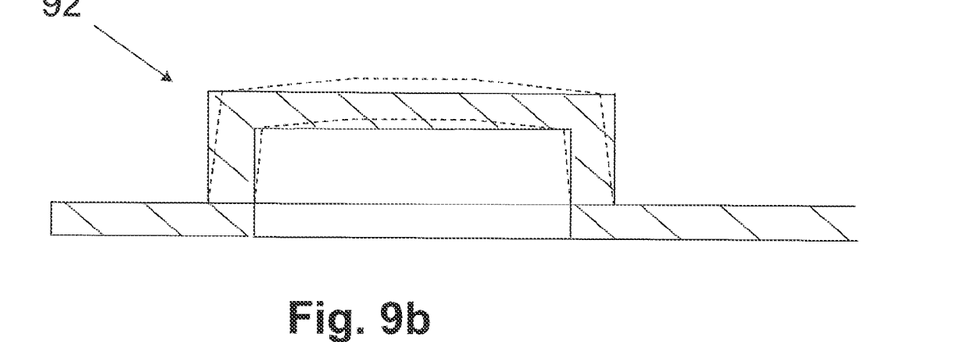
FIG. 9b illustrates in cross-section a centrally located welding support member.

In this embodiment the centrally located support 92, shown in detail in FIG. 9*b*, is resilient in itself and it will keep the top plate and the support plate fixed to each other not only vertically but also laterally.

Figure 9C:
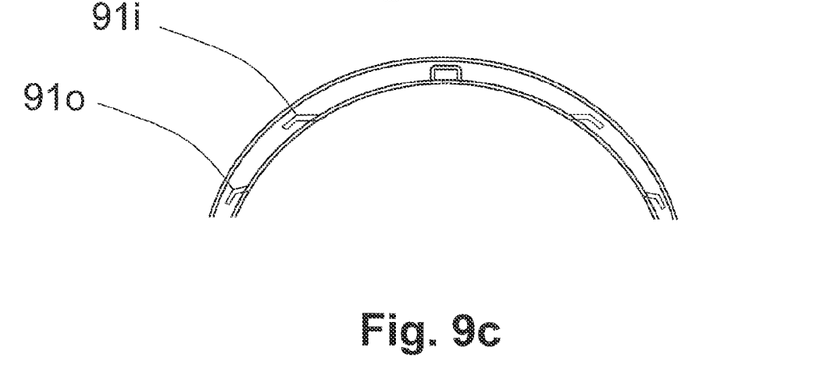
FIG. 9c illustrates a further arched embodiment of the assembly according to the inventions schematically and comprising additional weld support members.

When the outer ends of a fuel cell assembly 90 in this embodiment bends upwards due to the spring force of the top and support, the outwards pointing tongues of the support plate will compress the components located between the plates even more than in the compression exerted during the welding. If there are more than one outer weld point, as exemplified in FIG. 9*c*, the angle between the stem of the weld support and the horizontal plane of the backing plate 11 of the inner 91*i* and the outer 91*o* tongues can be different, suitably larger at the outer tongues.

EXAMPLE

Two five-cell (five active cells and one sensor cell) assemblies were built using the novel welding according to the present invention. One had a top plate with a thickness of 0.5 mm, the other had a top plate 0.6 mm thick. The support plate was 0.5 mm for both assemblies.

From top to bottom the top plate 15 was a stainless steel (EN1.4310) material with lateral dimensions 120×46 mm. Under that was placed a flexfoil 14 made of polyimide of 70 micrometer thickness provided with a 20 micrometer thick Cu pattern defining contact areas for each cell and electrical leads for sensors. The flexfoil was gold coated by electroplating on areas which were in contact with the cathode GDL and the current collector foil of the fuel cell sticker.

The fuel cell sticker 13 contained five MEAs (Gore P-05215) of dimension 16×36 mm and ten GDLs (SGL BC34) of dimensions 13×33 mm. Smaller pieces of MEA and GDL was used for the sensor cell. The anode current collector foil was a Sn coated Cu foil (Tesa 4385), with the adhesive turned downwards) and the frame material 13*h* was a compressible foam material (Poron 4790). Adhesive material used in the fuel cell sticker was 3M F9469PC.

A polycarbonate material of 0.48 mm thickness was used for the gas distribution member 12.

Both the support plate and the top plate were cut out by means of chemical etching method. The support plate was made of the same steel as the top plate. The tongues of the support plate were preshaped before assembly and welding the whole assembly.

During the welding operation the support plate and top plate were compressed together in a special tool. The spot welding apparatus was operated at 2000 A and 3-5 V.

Figure 12:
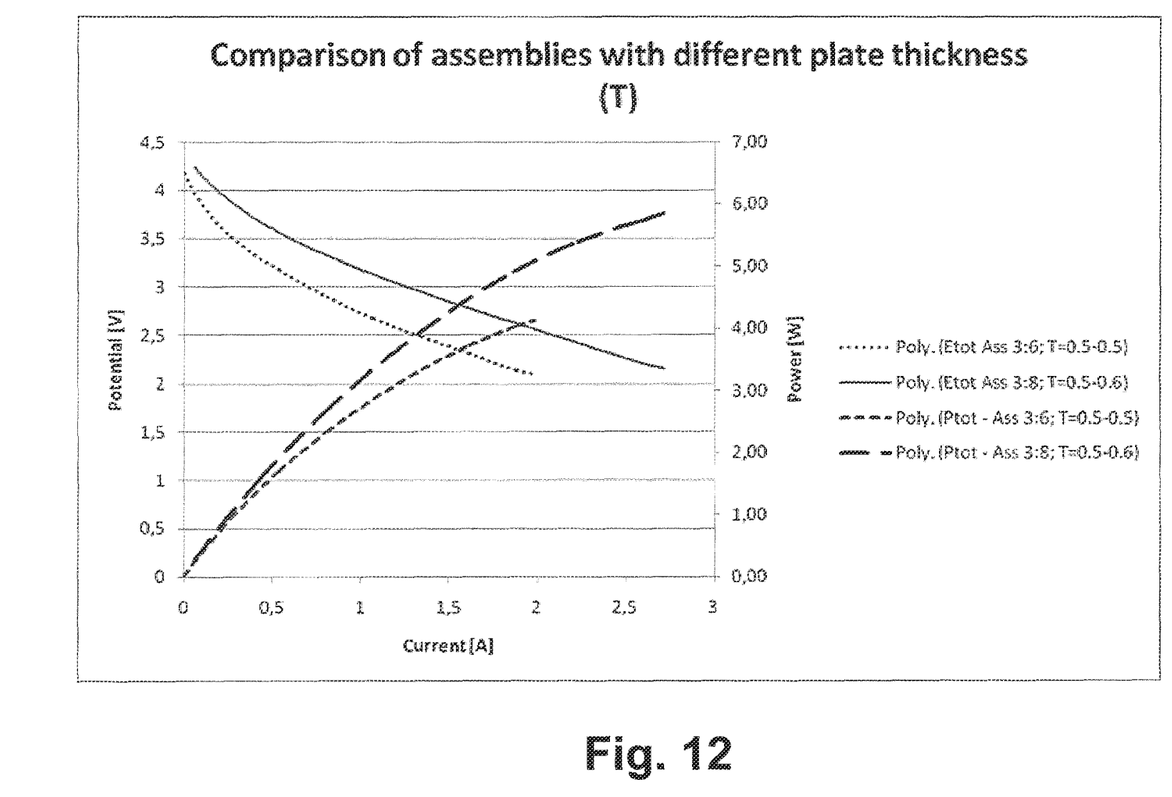
FIG. 12 is a graph showing the electrochemical performance of two examples of assemblies according to the invention.

The assemblies were electrochemically tested in open end mode. The electric connection was a 14 pole connector(JAE, IL-FPR-14S-HF). The electrochemical performance the two assemblies after activation is shown in FIG. 12. One curve shows power and the other voltage as a function of current for each assembly.

The curves show that the assembly having a thicker top plate (0.6 mm) is performs better and that this assembly can provide almost 6 W at a voltage of 2.15 V.

The invention claimed is:

1. Polymer electrolyte membrane fuel cell apparatus, comprising:
    a backing plate;
    a top clamping plate;
    at least one in-plane planar fuel cell assembly interposed between said top plate and said backing plate;
    a current collector foil interposed between the planar fuel cells and the top clamping plate, said current collector foil comprising an electrically non-conductive foil having a pattern of electrically conductive material provided thereon on the side facing the planar fuel cell; wherein
    the fuel cell apparatus is held together by spot welds between the top clamping plate and the backing plate.

2. The polymer electrolyte membrane fuel cell as claimed in claim 1, wherein the backing plate has a plurality of welding support members forming spacer members and spot welding contact points, and wherein the assembly is held together by spot welds between the top clamping plate and the welding support members on the backing plate.

3. The polymer electrolyte membrane fuel cell as claimed in claim 2, wherein the support members have been formed by punching in the backing plate.

4. The polymer electrolyte membrane fuel cell as claimed in claim 2, wherein the support members comprise lugs protruding from the backing plate.

5. The polymer electrolyte membrane fuel cell as claimed in claim 4, wherein the lugs are provided in the form of bent tongues.

6. The polymer electrolyte membrane fuel cell as claimed in claim 2, wherein the support members are resilient.

7. The polymer electrolyte membrane fuel cell as claimed in claim 1, wherein the current collector foil has thickness of <0.25 mm.

8. The polymer electrolyte membrane fuel cell as claimed in claim 1, wherein the conductive pattern forms electrical conductors comprising leads for transporting electric current generated by the fuel cells and connectors for coupling the fuel cell to external devices.

9. The polymer electrolyte membrane fuel cell as claimed in claim 1, wherein the polymer electrolyte membrane fuel cell comprises at least two planar fuel cells in an in-line configuration, and wherein the current collector foil extends over the entire assembly.

10. The polymer electrolyte membrane fuel cell as claimed in claim 1, wherein the current collector foil comprises a tongue portion extending in the longitudinal direction out from the assembly to provide a connector for external coupling.

11. The polymer electrolyte membrane fuel cell as claimed in claim 1, wherein the conductive pattern comprises Cu.

12. The polymer electrolyte membrane fuel cell as claimed in claim 1, wherein the conductive pattern comprises electrical leads for conveying the power generated in the fuel cells to an output terminal.

13. The polymer electrolyte membrane fuel cell as claimed in claim 1, wherein the conductive pattern comprises elements usable as sensing means for sensing temperature or voltage.

14. The polymer electrolyte membrane fuel cell as claimed in claim 1, wherein the conductive pattern comprises leads for supplying voltage for operating or controlling a valve.

15. The polymer electrolyte membrane fuel cell as claimed in claim 13, wherein said sensing means include a thermoelement or a thermoresistor.

16. The polymer electrolyte membrane fuel cell as claimed in claim 1, wherein the current collector foil comprises a base/substrate foil of a non-conductive and flexible material;

a pattern of a conductive material provided on said substrate foil, the pattern comprising electrical leads;

wherein said conductive pattern matches the lay-out of said in-plane polymer electrolyte membrane fuel cell, such that when the current collector foil is attached to said assembly, the fuel cell units making up the assembly are connected in series by said current collector foil.

17. The polymer electrolyte membrane fuel cell as claimed in claim 1, wherein the conductive pattern comprises elements usable as sensing means for sensing temperature and voltage.

18. The polymer electrolyte membrane fuel cell as claimed in claim 1, wherein the conductive pattern comprises leads for supplying voltage for operating and controlling a valve.

19. The polymer electrolyte membrane fuel cell as claimed in claim 13, wherein said sensing means include a thermoelement and a thermoresistor.

20. The polymer electrolyte membrane fuel cell as claimed in claim 1, wherein the current collector foil comprises a base/substrate foil of a non-conductive and flexible material;

a pattern of a conductive material provided on said substrate foil, the pattern comprising electrical leads and sensors;

wherein said conductive pattern matches the lay-out of said in-plane polymer electrolyte membrane fuel cell, such that when the current collector foil is attached to said assembly, the fuel cell units making up the assembly are connected in series by said current collector foil.

\* \* \* \* \*